Patented Apr. 25, 1944

2,347,576

UNITED STATES PATENT OFFICE 2,347,576

CRUDE RUBBER

Stewart R. Ogilby, Eltingville, Staten Island, N. Y., assignor to United States Rubber Company, New York, N. Y., a corporation of New Jersey No Drawing. Application June 21, 1941, Serial No. 399,208

8 Claims. (Cl. 260—821)

This invention relates to a method of obtaining crude rubber from the serum portion or skim resulting from the creaming of latex. The invention is an improvement over that part of my application Serial No. 385,853, filed March 29, 1941, which relates to the recovery of high grade rubber from skimmed latex, as shown in Example 7 thereof.

In present day commercial mechanical creaming or centrifuging of latex, the cream or concentrated portion generally has a total solids content of around 60% and a lower ratio of non-rubber constituents to the rubber content than is found in normal latex. Centrifuge skim generally has a total solids content from about 10 to 20% and a much higher ratio of proteins and other non-rubber ingredients to the rubber than is found in normal latex, the solids of the skim analyzing around 70 to 75% rubber and 25 to 30% non-rubbers. In present day commercial chemical creaming of latex by adding a vegetable gum or other creaming agent to the latex and allowing it to separate into a cream and a serum portion on standing, the percentage of solids in the serum portion may be somewhat less than in a centrifuged skim resulting in a higher rubber recovery in the cream, but the ratio of proteins and other non-rubber constituents to the rubber in the serum portion is as high, if not higher, than in the case of centrifuge skim. In the present specification, the word "creaming" unless otherwise modified, is used in its generic sense as including both that form of mechanical creaming commonly known as centrifuging, and chemical creaming. In cases where the centrifuging or chemical creaming operations are purposely so regulated that a large amount of the rubber or even a major proportion of the rubber of the original latex is retained in the serum portion, there will also be present in the serum portion a larger ratio of proteins to rubber than in normal latex because of the retention of the smaller rubber particles in the serum. Because of this relatively high ratio of proteins to rubber in the serum portion resulting from the creaming of latex, particularly in present day chemical creaming and centrifuging operations, it is difficult to coagulate the rubber in the serum with acid, and the rubber obtained therefrom by acid coagulation will contain an undesirably high percentage of proteins. It is necessary in recovering the rubber from such serum portions by acid coagulation to reduce the pH to a lower value than in the case of normal latex in order to induce coagulation. This coagulation at relatively low pH's insolubilizes many of the normally soluble proteins of the latex which at higher pH's, as in the usual coagulation of normal latex, would remain soluble and thus not be coagulated with the rubber.

According to the present invention, the rubber of the serum portion resulting from the creaming of latex may be coagulated at a relatively high pH so that a greater proportion of the soluble proteins in the serum will remain soluble on coagulation of the rubber, and thus a lower protein content crude rubber will be recovered from the serum. The protein content of ordinary acid-coagulated rubber, such as first latex smoked sheet or pale crepe varies from about 2 to 4%, while the protein content of acid-coagulated skim from a present day centrifuging operation, for example, will run around 6%. By the present invention, the protein content of crude rubber prepared from the serum portion of a creaming operation will compare favorably with the protein content of normally prepared crude rubbers, such as smoked sheet and pale crepe.

In carrying out the present invention, the rubber in the serum portion resulting from the creaming of an alkali-preserved latex is flocculated by the addition of acid in the presence of a small amount of water-soluble alkylene polyamine having at least 3 amino groups, washed if desired, and separated from the aqueous menstruum and dried. It has been found that the pH value at which the rubber particles in the serum will flocculate or coagulate in the presence of such polyamines is much higher than the pH to which the serum must be reduced to flocculate the rubber in the serum in the absence of the polyamines. The rubber recovered from the serum portion at such higher pH's contains a smaller proportion of proteins than rubber recovered at the lower pH's. The flocculated rubber may be washed by diluting the serum portion with water before flocculating but preferably the serum is diluted after flocculating so that less acid will be needed to reduce the pH to the flocculation point. The flocculated rubber will rise in the latex after a period of time to form the usual cheesy coagulum which may readily be removed, passed through creping rolls and dried to form crude rubber. The order of addition of the acid and polyamine is immaterial. The amount of polyamine is not critical, and the more polyamine added, the higher will be the pH at which the rubber will flocculate. 1.0% to 4.0% of amine based on the serum solids has been found satisfactory to appreciably raise the pH at which the serum portion will flocculate on addition of acidic material so as to materially reduce the protein content of the recovered crude rubber. The serum portion for treatment according to the present invention may be from a latex preserved with an alkali, such as ammonia, with or without addition of germicidal agents. The pH of the serum may be reduced to flocculate the rubber by means of any of the acids commonly used to coagulate crude rubbers. Various water-soluble alkylene polyamines having three or more amino groups may be used to raise the pH at which the rubber in the serum will flocculate, for example, diethylene triamine, triethylene tetramine, tetraethylene pentamine, other polyamines resulting from the reaction of alkylene dihalides with ammonia or primary amines, or mixtures of polymerized polyamines, such as the aldehydeamine reaction product sold under the trade name "Trimene Base." The amino groups may be primary, secondary, or tertiary amino groups.

As an illustration of the present invention, a mixture of polyalkylene polyamines was first prepared as follows: 35 parts by weight of ethylene dichloride were reacted in an autoclave with 51 parts by weight of 26° Bé. aqua ammonia at a temperature between 160° C. and 190° C. for 2 hours. After the reaction was complete and the liquid had cooled at room temperature for 2 hours, 35 parts by weight of 75% caustic solution were added and the mixture was heated to decompose the amine hydrochlorides and the ammonium chloride remaining in solution, and to drive out the ammonia. The reaction mixture separated into an oily upper layer comprising an aqueous solution of a mixture of polyamines, some of which had three and four amino groups, and a lower layer containing a water solution of caustic and suspended sodium chloride. The oily layer, referred to hereafter as "polyalkylene polyamine mixture," was separated from the lower layer.

To 5570 parts by weight of a centrifuge skim containing 18% total solids and .26% ammonia, there were added 260 parts by weight of 2.67 normal acetic acid and 360 parts by weight of a 5% aqueous solution of the "polyalkylene polyamine mixture" as prepared above, whereupon the rubber particles flocculated to form a suspension of agglomerated rubber in a dark colored serum. The pH at which the rubber flocculated was 8.1. After the rubber had been thus flocculated, there was added 13,800 parts by weight of water, the mass was thoroughly stirred, and was allowed to stand. After several hours the flocculated rubber had creamed to the surface and coalesced to form a cheesy mass which was readily removed as a whole from the serum. This mass was passed through a creping roll to remove the majority of the associated serum, and dried. The rubber thus recovered showed a protein content of 2.9%. Another portion of the same skim was similarly flocculated by means of acid and diluted to the same extent but without the addition of the polyamine. In this case sufficient acid had to be added to reduce the pH to 4.6 before flocculation ensued. The rubber recovered from the serum flocculated at this low pH on analysis showed a protein content of 5.7%. It may thus be seen that by flocculating the rubber in the serum portion at a high pH by virtue of the presence of polyamines, a crude rubber with a normal protein content was recovered, whereas on coagulation with acid alone, the recovered crude rubber had a protein content approximately double the normal protein content of ordinary crude rubber.

In view of the many changes and modifications that may be made without departing from the principles underlying the invention, reference should be made to the appended claims for an understanding of the scope of the invention.

Having thus described my invention, what I claim and desire to protect by Letters Patent is:

1. The method of obtaining crude rubber from the serum portion resulting from the creaming of an alkali-preserved latex which comprises flocculating the rubber in the serum portion with an acid at a pH above 4.6 in the presence of a water-soluble alkylene polyamine having at least three amino groups and being capable of raising to above 4.6 the pH at which flocculation by acid can be effected.

2. The method of obtaining crude rubber from the serum portion resulting from the creaming of an alkali-preserved latex which comprises flocculating the rubber in the serum portion with an acid at a pH above 4.6 in the presence of a water-soluble alkylene polyamine having at least three amino groups and being capable of raising to above 4.6 the pH at which flocculation by acid can be effected, and washing the rubber flocs.

3. The method of obtaining crude rubber from the serum portion resulting from the creaming of an alkali-preserved latex which comprises flocculating the rubber in the serum portion with an acid at a pH above 4.6 in the presence of a water-soluble alkylene polyamine having at least three amino groups and being capable of raising to above 4.6 the pH at which flocculation by acid can be effected, and diluting the serum portion with water.

4. The method of obtaining crude rubber from the serum portion resulting from the creaming of an alkali-preserved latex which comprises flocculating the rubber in the serum portion with an acid at a pH above 4.6 in the presence of a water-soluble alkylene polyamine having at least three amino groups and being capable of raising to above 4.6 the pH at which flocculation by acid can be effected, and diluting the flocculated serum portion with water.

5. The method of obtaining crude rubber from the serum portion resulting from the creaming of an alkali-preserved latex which comprises flocculating the rubber in the serum portion by lowering the pH of the serum portion with acid to a value between 4.6 and the initial pH of the serum portion in the presence of a water-soluble alkylene polyamine having at least three amino groups and being capable of raising to above 4.6 the pH at which flocculation by acid can be effected.

6. The method of obtaining crude rubber from the serum portion resulting from the creaming of an alkali-preserved latex which comprises flocculating the rubber in the serum portion by lowering the pH of the serum portion with acid to a value between 4.6 and the initial pH of the serum portion in the presence of a water-soluble alkylene polyamine having at least three amino groups and being capable of raising to above 4.6 the pH at which flocculation by acid can be effected, and washing the rubber flocs.

7. The method of obtaining crude rubber from the serum portion resulting from the creaming of an alkali-preserved latex which comprises flocculating the rubber in the serum portion by lowering the pH of the serum portion with acid to a value between 4.6 and the initial pH of the serum portion in the presence of a water-soluble alkylene polyamine having at least three amino groups and being capable of raising to above 4.6 the pH at which flocculation by acid can be effected, and diluting the serum portion with water.

8. The method of obtaining crude rubber from the serum portion resulting from the creaming of an alkali-preserved latex which comprises flocculating the rubber in the serum portion by lowering the pH of the serum portion with acid to a value between 4.6 and the initial pH of the serum portion in the presence of a water-soluble alkylene polyamine having at least three amino groups and being capable of raising to above 4.6 the pH at which flocculation by acid can be effected, and diluting the flocculated serum portion with water.

STEWART R. OGILBY.